(12) United States Patent
Bernstein et al.

(10) Patent No.: US 6,970,189 B1
(45) Date of Patent: Nov. 29, 2005

(54) METHOD AND SYSTEM FOR AUTOMATICALLY CONFIGURING A HAND-HELD CAMERA USING WIRELESS COMMUNICATION TO IMPROVE IMAGE QUALITY

(75) Inventors: John D. Bernstein, Gilroy, CA (US); Eric Anderson, Gardnerville, NV (US); Stephen G. Sullivan, Mt. View, CA (US)

(73) Assignee: IPAC Acquisition Subsidiary I, LLC, Portsmouth, NH (US)

( * ) Notice: Subject to any disclaimer, the term of this patent is extended or adjusted under 35 U.S.C. 154(b) by 692 days.

(21) Appl. No.: 09/585,891

(22) Filed: May 31, 2000

(51) Int. Cl.[7] ............................................ H04N 5/232
(52) U.S. Cl. ............................ 348/211.2; 348/207.99
(58) Field of Search ..................... 348/211.2, 207.99; 340/500

(56) References Cited

U.S. PATENT DOCUMENTS

| | | | |
|---|---|---|---|
| 5,625,765 A | 4/1997 | Ellenby et al. | |
| 5,682,332 A | 10/1997 | Ellenby et al. | |
| 5,745,126 A * | 4/1998 | Jain et al. | 382/154 |
| 5,768,633 A * | 6/1998 | Allen et al. | 396/2 |
| 5,815,411 A | 9/1998 | Ellenby et al. | |
| 5,999,213 A * | 12/1999 | Tsushima et al. | 348/180 |
| 6,006,039 A * | 12/1999 | Steinberg et al. | 396/57 |
| 6,163,816 A * | 12/2000 | Anderson | 710/8 |
| 6,300,976 B1 * | 10/2001 | Fukuoka | 348/231.99 |
| 6,396,537 B1 * | 5/2002 | Squilla et al. | 348/239 |
| 6,459,388 B1 * | 10/2002 | Baron | 340/996 |

OTHER PUBLICATIONS

Popular Photography, Sep. 1993, "Laboratory Analysis—Data Link: The Future of Camera Technology".

* cited by examiner

*Primary Examiner*—Tuan Ho
*Assistant Examiner*—Heather R. Long
(74) *Attorney, Agent, or Firm*—Sawyer Law Group LLP

(57) ABSTRACT

A method and systems for automatically configuring a hand-held camera to improve quality of an image taken with the camera of a particular subject at a photo opportunity site is disclosed. First, values for a set of camera setting parameters are optimized to enhance image quality of a picture taken at that location are determined. Next, wireless communication with the camera is established, and the set of setting parameter values are pushed to camera via the wireless communication to automatically configure the camera to take a picture of the subject.

52 Claims, 13 Drawing Sheets

SERVER PROCESS

In-Camera Process

METHOD AND SYSTEM FOR AUTOMATICALLY CONFIGURING A HAND-HELD CAMERA USING WIRELESS COMMUNICATION TO IMPROVE IMAGE QUALITY

FIELD OF THE INVENTION

The present invention relates to configuring camera settings, and more particularly to a method and system for automatically configuring a hand-held camera using wireless communication to improve image quality.

BACKGROUND OF THE INVENTION

It is well known that cameras have various settings that must be properly configured to enable the camera to take a picture having correct focus and exposure. Most cameras have a manual mode and one or more automatic modes for configuring the settings. In the manual mode, the user physically adjusts the settings based on experience and judgment, while in automatic mode, the camera automatically adjust its settings.

While automatic mode was designed to eliminate an amateur's stumbling block to more successful picture-taking, the settings are configured based on a set of relatively simple heuristics that often prove to be wrong. For example, in digital cameras, white balance may be automatically set based on a principle called "grey world" where all color pixels on the CCD are added such that the total color averages to grey. While this principle may work in many environments, it may not work in others, such as in a dark, yellow-lit room that one would encounter in a bar or museum, for instance.

Similarly, automatic focus in cameras is for the most part based two types of heuristics called "hill climbing" and "range finding". In hill climbing, the lens is moved back and forth until the highest contrast point is detected in the center of the image, while in range finding, SONAR and infrared is used to provide a rough estimate of distance. While most automatic camera setting techniques work reasonably well, such as auto focus, camera's would take the highest quality photos possible if the need to "guess" at the conditions surrounding the subject to be photographed could be eliminated.

Accordingly, an improved method and system for configuring camera settings is needed. The present invention addresses such a need.

SUMMARY OF THE INVENTION

The present invention provides a method and system for automatically configuring a hand-held camera to improve quality of an image taken with the camera of a particular subject at a photo opportunity site. According to the method and system disclosed herein, values for a set of camera setting parameters that are optimized to enhance image quality of a picture taken at that location are determined. Next, wireless communication with the camera is established, and the set of setting parameter values are pushed to camera via the wireless communication to automatically configure the camera to take a picture of the subject.

According to the present invention, when a user subsequently captures the image using the settings values, image quality will be improved because the camera has been automatically configured for the conditions of the subject, such as the distance from the camera to the subject and lighting, which are factors known ahead of time. Therefore, the camera does not have to rely on potentially unreliable heuristics to set camera settings.

DETAILED DESCRIPTION OF THE INVENTION

The present invention provides a method and system for automatically configuring settings in a hand-held camera using wireless commutation to improve image quality. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
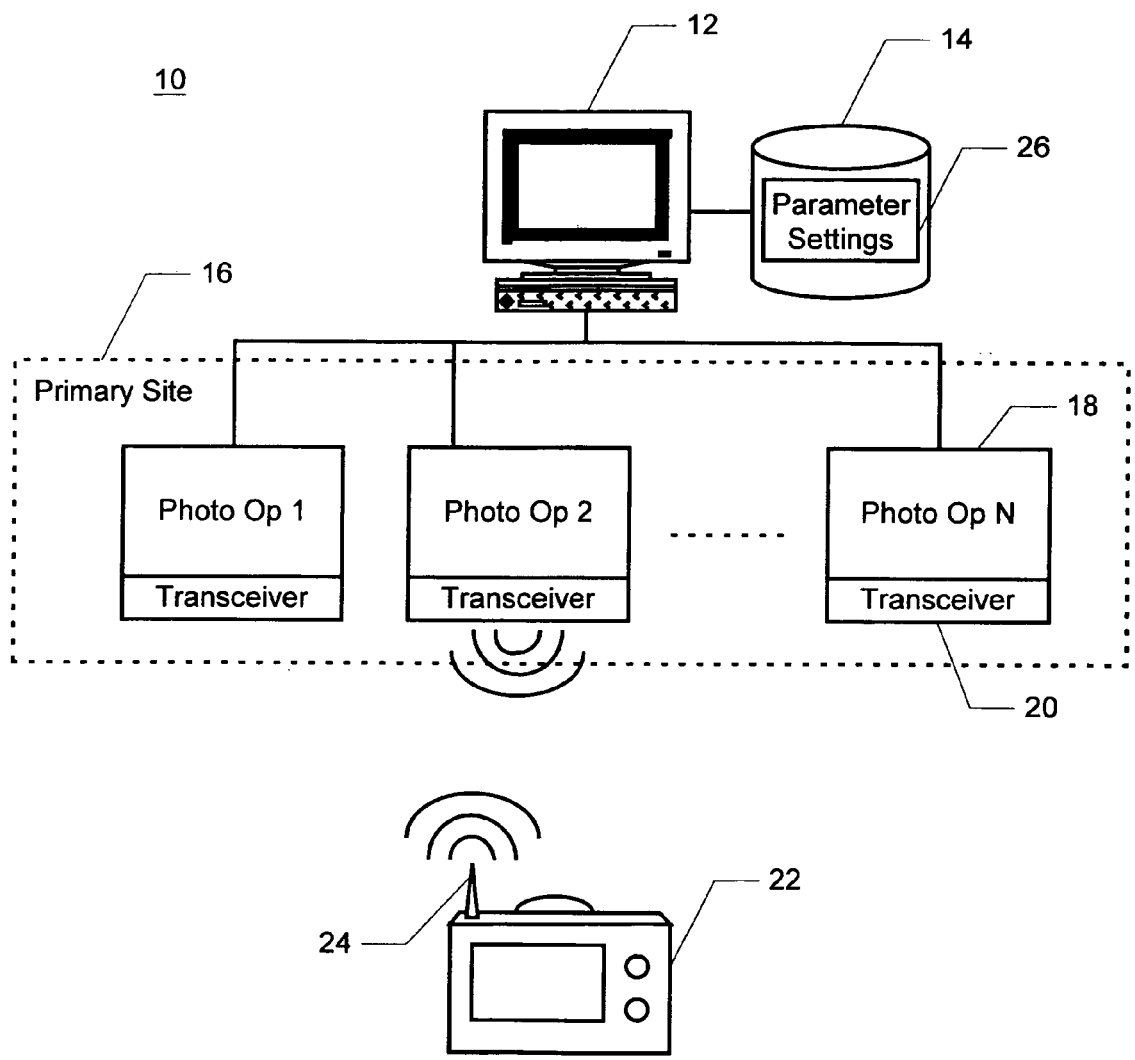
FIG. 1 is a block diagram illustrating a system for automatically configuring a hand-held camera in accordance with the present.

FIG. 1 is a block diagram illustrating a system for automatically configuring a hand-held camera in accordance with the present. In a preferred embodiment, the system 10 includes a server 12, a database 14, a primary site 16 having one or more photo opportunity sites 18, where each photo opportunity site 18 is in communication with the server 12 and is equipped with a wireless transceiver 20, and at least one a hand-held portable camera 22 that is also equipped with a wireless transceiver 24. An example of a primary site 16 is a tourist destination, such as a national park or museum that includes several scenic locations and/or attractions for visitors to take pictures of with their cameras 22. As used herein, any such scenic local and/or attraction that is visited by many people and is a popular photography spot may be called a photo opportunity site (hereinafter referred to as "photo op") 18.

According to the present invention, the primary site 16 or a third party content provider familiar with the conditions surrounding each photo op site 18, determines a set of predefined camera setting parameter values 26 for each photo op site 18 that are optimized to enhance image quality of a picture taken at that location, and stores theses parameter values in the database 14, preferably sorted by photo op site 18. As conditions change at each photo op site 18, the setting parameter values may be added or updated as required. Examples of a change in conditions for an indoor object include changes in environment, such as in lighting and positioning, for instance. For an outdoor object, environmental changes would also include changes in weather, time of day, and seasonal changes. When a camera makes contact with a photo op transceiver 20, the server 12 retrieves the setting parameter values stored in the database 14 and relays the setting parameter values to the appropriate photo op site 18.

At each photo op site 18, the transceiver 20 is located in proximity to where a user would capture an image of the subject with the camera 22. For example, the transceiver 20 could be located within a plaque commemorating the subject, or located within a kiosk device at the photo op site 18. When a user brings the camera 22 within range of the transceiver 20 at a photo op site 18, the transceiver 20 transmits the camera setting parameter values 26 to the camera 22 corresponding to the photo op site 18 to dynamically configure the camera's capture settings. When a user subsequently captures the image using those settings, image quality will be improved because the camera 22 has been automatically configured for the conditions of the subject, such as distance from the camera 22 to the subject and the lighting, which are known ahead of time. Therefore, the camera 22 does not have to rely on potentially unreliable heuristics to set camera settings.

To further illustrate the present invention, consider the following examples of the configuration system of the present invention deployed at various locations. As the first example, assume that primary site 16 is the Louvre Museum, France. Assume further that one of the photo op sites 18 is the Mona Lisa, and that visitors are allowed to take pictures, but without using a flash. As a user approaches with a compatible camera 22, the photo op transmitter 20 would transmit camera setting parameters to the camera 22. For example, the strobe or flash setting would be set to "off", a wide aperture and fast shutter speed would be chosen to reduce blurring since it is known the camera 22 will be hand-held, and gain control would be increased to compensate for a potentially under exposed image. Because the aperture is wide, the depth of field will be small, so focus is critical. However, according to the present invention, the distance from where the user stands to the picture of the Mona Lisa is already known, so the photo op site 18 would set the camera's focal distance to 1.8 meters, for instance.

As the second example, assume the photo op site 18 positioned at a look out point over the grand canyon, and that it is a sunny day. The photo op site 18 would send parameters similar to the following to the camera 22: "hyper focal distance, fastest shutter, strobe off, CCD gain off, and aperture smallest" to help minimize the amount of time the camera is in AutoS1 (searching for A*) state.

As a further example, assume the photo op site 18 is positioned within Disneyland in at the entrance to "Splash Mountain." The photo op site 18 would send parameters similar to the following to the camera 22: "high shutter speed, small aperture, focus distance 32 feet". The photo op site 18 could even instruct the camera to go to S2 (shutter position 2) automatically to synchronize when a water sled goes sliding down the water fall.

Thus, according to the present invention, the camera 22 is provided with the optimal set of camera settings that will produce the highest quality image possible, given the camera's capabilities, and the conditions surrounding the subject. Thus, the user does not have to rely on unreliable built-in camera 22 heuristics to determine how to configure the camera 22 for a particular subject. Instead, since the conditions at the photo op site 18 are known, the optimal camera setting parameters may be pre-stored in the database 14.

In a preferred embodiment of the present invention, each photo op site 18 may be connected to the server 12 via any type of communications network, such as a local area network (LAN), an intranet, or the Internet. And the transceivers 20 located at each photo op site 18 and the camera transceiver 24 are compatible with a wireless data transmission standard, such as Bluetooth (IEEE 802.15) or IRDA, although other wireless data transmission protocols may also be used. It should also be noted that the server 12 and/or the database 14 may be located within, or remote from, the primary site 16; and that in the case where there is only one photo op site 18, the photo op site 18 may also be considered the primary site 16.

According to a second aspect a present invention, the database 14 also contains additional content corresponding to each photo op, such as images, text and sound relating to the subject. The user may then display these images and text on the LCD of the camera 22 to learn more about the subject. Thus, not only will the camera 22 be automatically configured to capture the best quality image possible, but the additional information transmitted to the camera 22 will also allow the user's camera 22 to become a tour aid device. While some museums provide patrons with tape recorders for playing back prerecorded content, the tape recorders are specialized devices of the museum designed to perform a single function. The present invention, by contrast, allows dynamic, real-time configuration of a consumer device that is owned by the user instead of the photo op site 18, such that the camera becomes a dual functioning device when in the presence of the photo op transceiver.

According to a third aspect of the present invention, each photo op site 18 may be provided with weather instruments that relay the local weather conditions to the server 12. The server 12 may then use the current conditions to query the database 14 to retrieve the best parameters for the current conditions. For example, assume that the primary site 16 is a national park, such as Yosemite, and that multiple photo op transceivers 20 are placed in various locations through out the vast park. Since weather conditions may be different at one end of the park to the other (e.g. partly sunny vs. raining), the server 12 would send different sets of parameter values to each photo op site 18 based on the real-time weather reports received from each of the photo op sites 18.

Figure 2:
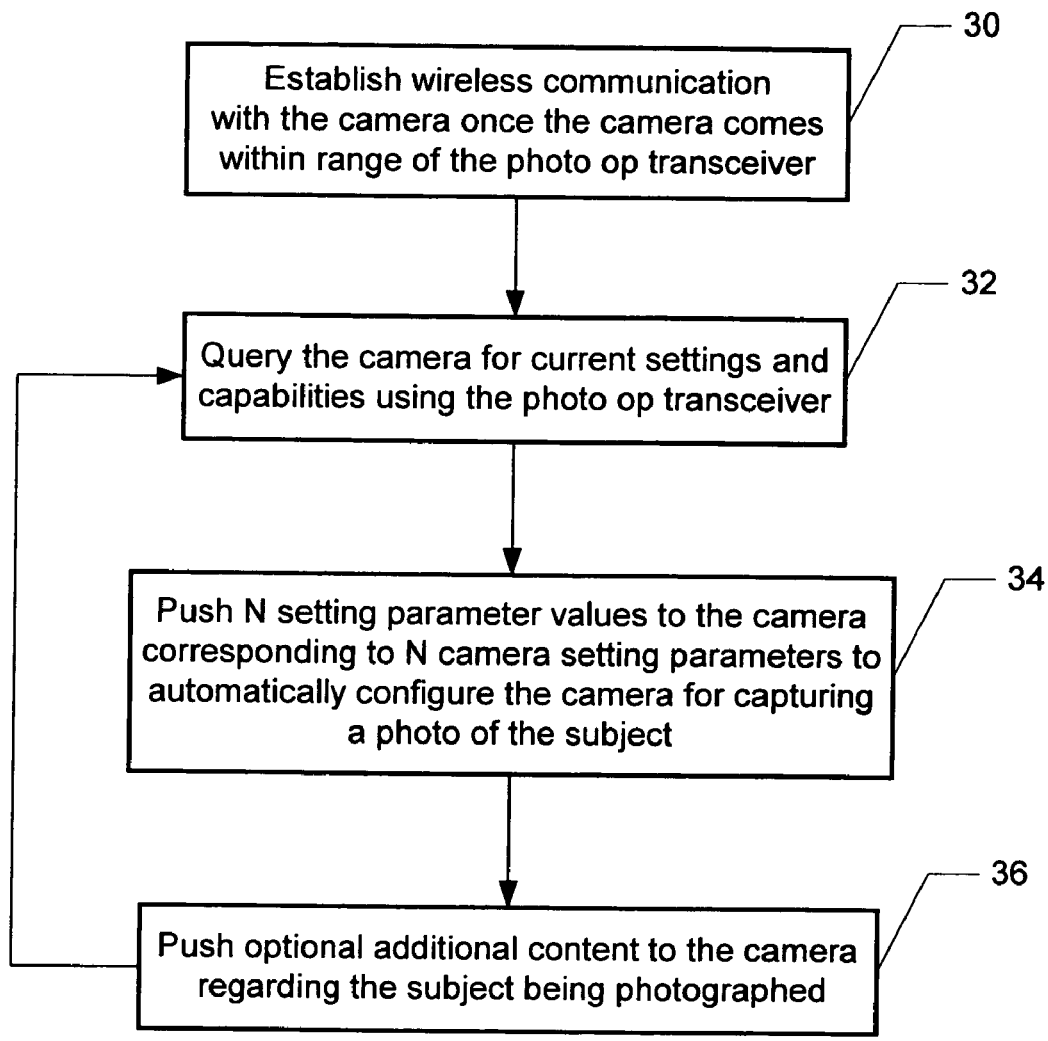
FIG. 2 is a flow chart illustrating in more detail a photo op transceiver process for automatically configuring capture settings of a hand-held camera in accordance with the present invention.

FIG. 2 is a flow chart illustrating in more detail the photo op transceiver process for automatically configuring capture settings of a hand-held camera 22 in accordance with the present invention. The process begins by establishing wireless communication between the photo opportunity site and the camera 22 once the camera 22 comes within range of the photo op transceiver 20 in step 30. After establishing communication, the photo op transceiver 20 queries the camera 22 for current settings and capabilities in step 32.

Table I below is a list showing N example camera setting parameters and corresponding value ranges that the camera 22 may return to the photo op transceiver 20:

TABLE I

| CAMERA PARAMETER SETTING | | VALUE RANGE |
|---|---|---|
| 1. | Aperture | f2–f8 |
| 2. | Shutter Speed | 1/1000 to 5 seconds |
| 3. | Focal Distance | |
| 4. | Zoom Position | |
| | | |
| N. | | |

It should be noted that the example camera setting parameters could be included in either a tradition film camera 22, or a digital camera 22. However, if the camera setting parameters are for a digital camera 22, other types of camera setting parameters would be included, such as CCD gain, and white balance. Since different digital cameras 22 have the capability of capturing various types of images such still images, burst images, timelapse images, panoramas, and movie clips, another setting parameter would be included to specify the applicable image type.

The photo op transceiver must query the camera 22 for camera setting capabilities because different cameras 22 made by different manufacturers may have different capabilities and capture setting parameters. In addition, a 35 mm SLR will have different capture setting parameters and value ranges than a digital camera 22. However, if only a limited number of types of cameras 22 are compatible with the configuration service and their capabilities are known, then the step of querying the camera 22 for capabilities may be omitted.

In response to determining the current capabilities and capture setting parameters of the camera 22, the photo op transceiver 20 pushes N setting parameter values 26 to the camera 22 corresponding to N camera setting parameters to automatically configure the camera 22 for capturing a photo of the subject in step 34. Since all the information about the conditions surrounding the subject being photographed is known ahead of time, the camera setting parameters may be optimized for the camera's capability to enable the camera 22 to take the highest quality picture of the subject possible under those conditions.

In addition to pushing camera settings parameter values to the camera 22, the photo op transceiver 20 may also push optional additional content to the camera 22 regarding the subject being photographed in step 36.

Figure 3:
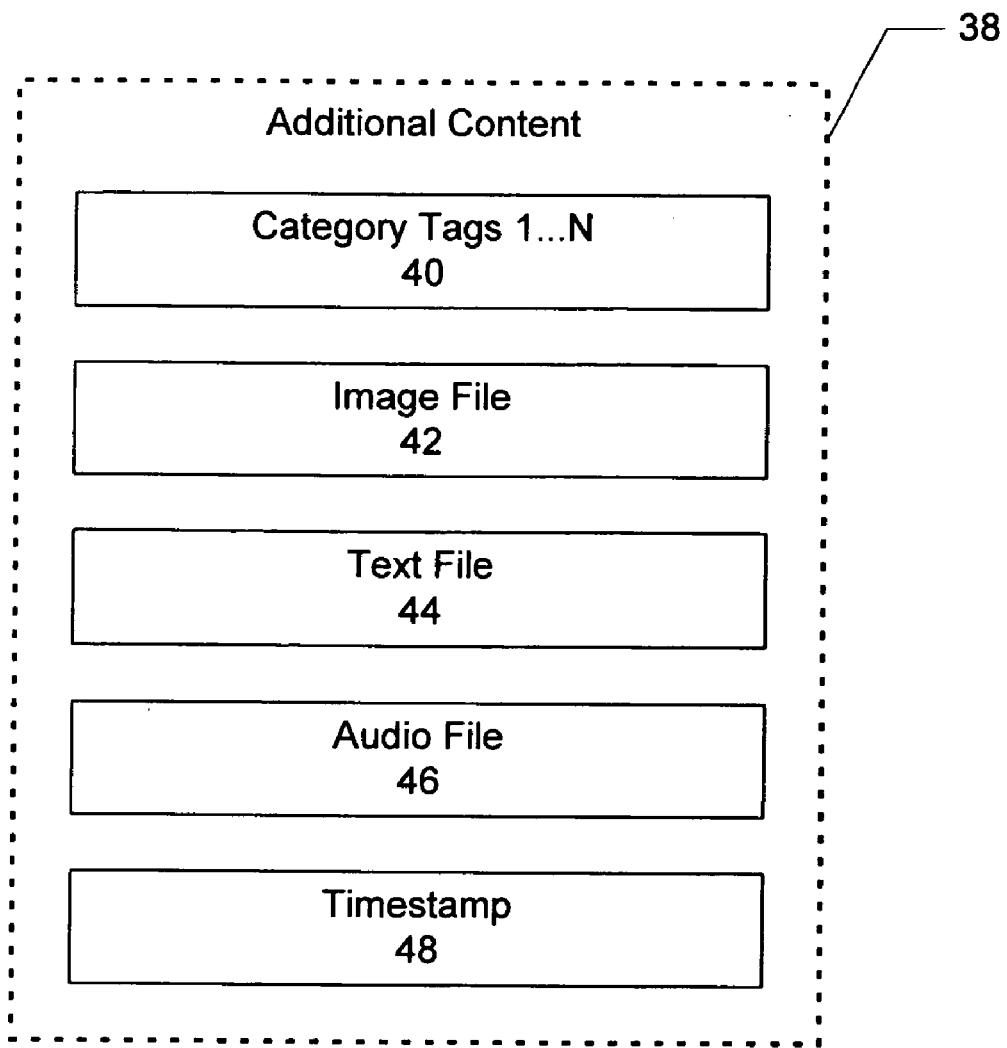
FIG. 3 is a block diagram illustrating examples of additional content that may be pushed to the camera by the photo op transceiver.

FIG. 3 is a block diagram illustrating examples of additional content that may be pushed to the camera 22 by the photo op transceiver 20. The additional content 38 may include one or more category tags 40, an image file 42, a text file 44, and an audio file 46. In a preferred embodiment, the category tags 40 are used by the camera 22 to automatically categorize the photograph of the subject that will subsequently be taken. For example, if the photo op site 18 is located at the Grand Canyon, a category tag of "Grand Canyon" may be sent to the camera 22 and associated with the image. The additional image file 42 could include an image of the Grand Canyon taken from a different location or under different weather conditions. The text file 44 could include history information, such as on the formation of the Grand Canyon, and the audio file 44 could include sound clips of nature in the Grand Canyon, or a narrative about rock formations, for example. The audio file 46 could optionally be associated with the image the user captures in a manner similar to associating the category tags 40 with the image.

According to a fourth aspect of the present invention, a timestamp 48 may also be included with the additional content 38 transmitted to the camera 22 that defines the total time the files may be stored in the camera 22. The timestamp 48 is discussed further below in conjunction with FIG. 4.

Referring again to FIG. 2, after the parameter values and optional content are pushed to the camera 22 in steps 34 and 36, the process continues at step 32 where the photo op transceiver queries the camera 22 for current settings. A change in the current settings will be relayed to the server 12, which will then use the current settings to retrieve a new set of capture setting parameter values 26 from the database 14 for transmission to the camera 22 via the photo op transceiver 20.

Figure 4:
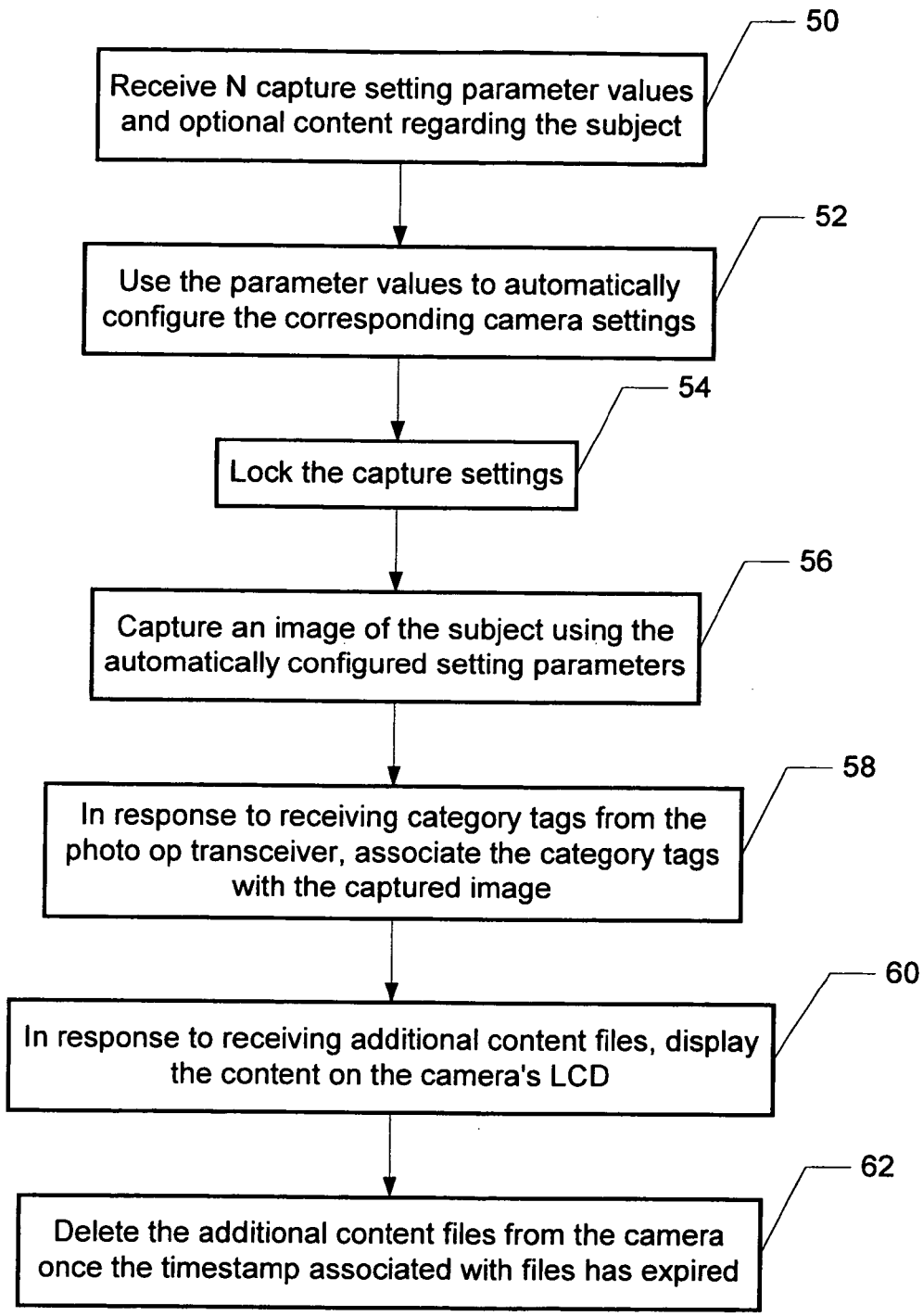
FIG. 4 is a flow chart illustrating the in-camera process for automatically configuring the camera's setting parameters after communication with a photo op transceiver has been established in accordance with the present invention.

Referring now to FIG. 4, a flow chart is shown illustrating the in-camera process for automatically configuring the camera's setting parameters after communication with a photo op transceiver 20 has been established in accordance with the present invention. The process begins by receiving the N camera setting parameter values 26 and optional content regarding the subject in step 50. The camera 22 then uses the parameter values to automatically configure the corresponding camera settings in step 52. After the camera's settings are automatically set, the camera 22 locks the capture settings in step 54.

In a preferred embodiment of the present invention, the zoom setting on the camera 22 is not locked in order to allow the user to zoom in and out of the scene. As those with ordinary skill in the art will readily recognize, changing the zoom setting may require new setting parameter values, such as a change in exposure and focus. Therefore, the process of querying the camera 22 by the photo op transceiver for current settings is performed periodically so that as the user varies the zoom setting, the setting parameter values pushed to the camera 22 by the photo op transceiver 20 are updated accordingly.

After the settings parameter values are locked, the user may capture an image of the subject using the automatically configured setting parameters in step 56. In response to receiving category tags 40 from the photo op transceiver, the camera 22 associates the category tags with the captured image for automatic categorization in step 58. In a preferred embodiment, the user must request that the image be automatically categorized. Although the category tags 40 may be associated with the image using a variety of methods, in a preferred embodiment, the category tags 40 are stored within the image file itself.

In response to receiving additional content files 42–46 corresponding to the subject, the camera 22 displays the content on the camera's LCD in step 60. In a preferred embodiment, the user is prompted to place the camera 22 in play mode to play the additional content.

In a preferred embodiment, the additional content files 42–46 are deleted from the camera 22 once the timestamp 48 associated with files has expired in step 62. In a preferred embodiment, the timestamp 48 is implemented as a numerical value that the camera 22 uses as countdown timer. When the value is received, the camera 22 continually decrements the value until it becomes zero, at which point the files associated with the timestamp 48 are deleted. In an alternative embodiment, the timestamp 48 is implemented as a literal expiration time (GMT), or a usage count (e.g., the content may be viewed 5 times before deletion.

According to the present invention, the timestamp 48 is transmitted to the camera 22 along with the additional content 38 for two reasons. One reason is that the proprietor of the primary site 16 may have spent considerable time and expense producing the additional content 38 for the visitors, and by ensuring that the additional content 38 remains on the user's camera 22 for only a predetermined amount of time, some measure of copyright protection is afforded. The second reason that the timestamp 48 is provided is that automatic deletion ensures that the camera's memory is not filled with undesired material.

In another embodiment, users may be offered the opportunity to pay for the additional content 38 upon exiting the primary site 16. When payment is received, a transceiver located at the payment center would resend the selected content to the camera 22 without the timestamp 48.

Figure 5:
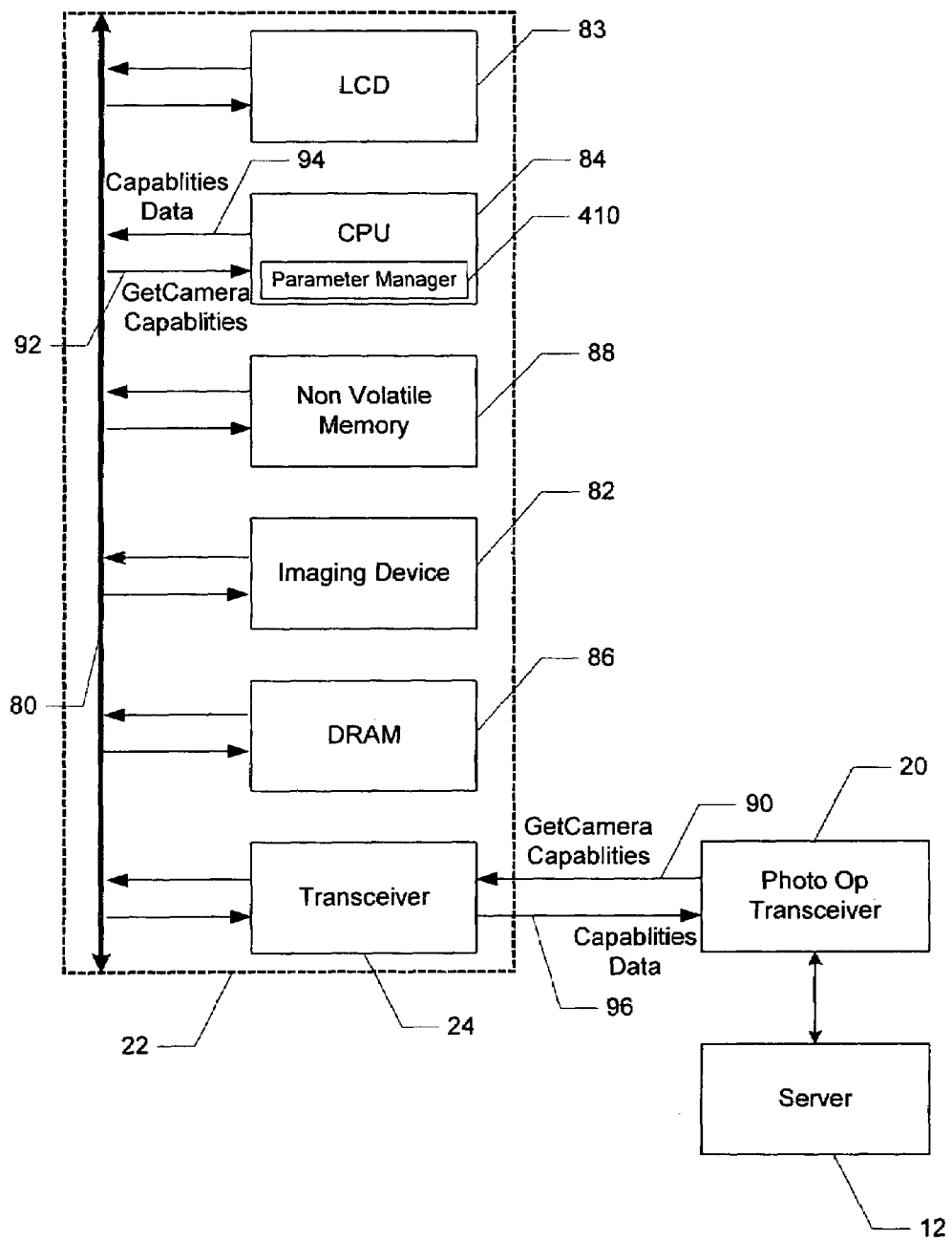
FIG. 5 is a block diagram illustrating an example camera architecture for supporting wireless communication of software commands and information between the digital camera and server is shown in accordance with the present invention.

Referring now to FIG. 5, a block diagram illustrating an example camera architecture for supporting wireless communication of software commands and information between the digital camera 22 and server 12 for auto configuration is shown in accordance with the present invention. System bus 80 provides connection paths between imaging device 82, Liquid Crystal Display (LCD) 83, central processing unit (CPU) 84, dynamic random-access memory (DRAM) 86, transceiver 24, and non-volatile memory 88.

CPU 84 typically includes a conventional processor device for controlling the operation of camera 22. In the preferred embodiment, CPU 84 is capable of concurrently running multiple software routines to control the various processes of camera 22 within a multi-threaded environment. DRAM 86 is a contiguous block of dynamic memory which may be selectively allocated to various storage functions. CPU 84, or optionally an LCD controller, accesses DRAM 86 and transfers processed image data to LCD screen 83 for display. Non-volatile memory 88, which may typically comprise a conventional read-only memory or flash memory, stores a set of computer-readable program instructions to control the operation of camera 22.

In a preferred embodiment, the digital camera 22 includes a modularized series of capability parameter storage locations for containing parameter values, and parameter manager 410 software responsive to receiving a software command from the server 12 to retrieve and return the capability parameter values to the server 12. For purposes of description, the software command is referred to herein as a "GetCameraCapabilities" command.

When the digital camera 22 comes within range of the photo op transceiver 20, the server 12 issues the GetCameraCapabilities command to the camera 22 through the photo op transceiver 20, shown by line 90. In the preferred embodiment of the invention, interface lines 90 and 96 represent a wireless data communication standard, such as Bluetooth, for instance. The camera's transceiver 24 receives the GetCameraCapabilities command, and responsively passes the command to CPU 84 via system bus 80. CPU 84, acting upon the GetCameraCapabilities command and using the parameter manager 410 software, accesses the capability data contained in parameter manager 410 via line 92. Parameter manager 410 then transfers the capability data via line 94 and system bus 80 to transceiver 24, which responsively transmits the capability data to photo op transceiver 20. Photo op transceiver 20 then passes the data on to the server 12. The server 12 uses the data and the I.D. of the photo op site 18 to query the database 14 for the appropriate set of camera setting parameter values for the automatic configuration of the camera 22.

The GetCameraCapabilities command may retrieve the capability parameter value sets in several ways. In one embodiment of the present invention, if the GetCameraCapabilities command is issued with the capability parameter abbreviated name field (called the PName field) set to all nulls, then the parameter manager will interpret this as requesting a complete set of all of the capability parameters. The parameter manager first returns a numerical value called ResLength, which typically will be the number of different capability parameters which the interrogated camera 22 supports. After the parameter manager returns the ResLength, it then sends the value sets for all of the capability parameters supported by the camera 22.

In a second embodiment of the present invention, if the GetCameraCapabilities command is issued with the PName field set to all nulls, then the parameter manager will interpret this as requesting a set of all of those capability parameters which are not included in a specified core camera 22 capability parameters set. The parameter manager first returns ResLength, which typically will be the number of different capability parameters not included in the specified core camera 22 capability parameters that the interrogated camera 22 supports. After the parameter manager returns the ResLength, it then sends the value sets for all of the capability parameters which are not included in the specified core camera 22 capability parameters supported by the camera 22.

If either of the foregoing embodiments of the present invention issues a GetCameraCapabilities command with the PName field set to a non-null value, the parameter manager interprets this as a request for the value set corresponding to the specific PName capability parameter. In this case, the value of ResLength returned is 1, and the single value set corresponding to the specific PName capability parameter is returned following ResLength.

The server 12 or the user of the camera 22 may therefore more efficiently and effectively obtain sets of capability parameters for the digital camera 22, in accordance with the present invention.

In the FIG. 5 embodiment, server 12 issued the GetCameraCapabilities command. In other embodiments of the present invention, the GetCameraCapabilities command may be issued in response to the user pressing one of the buttons and dials (not shown) of the digital camera 22, or by a special parameter script imported into digital camera 22 via a removable memory and executed by CPU 84. The capability parameters would then be displayed on LCD screen 83, preferably in the form of a series of menus.

Figure 6:
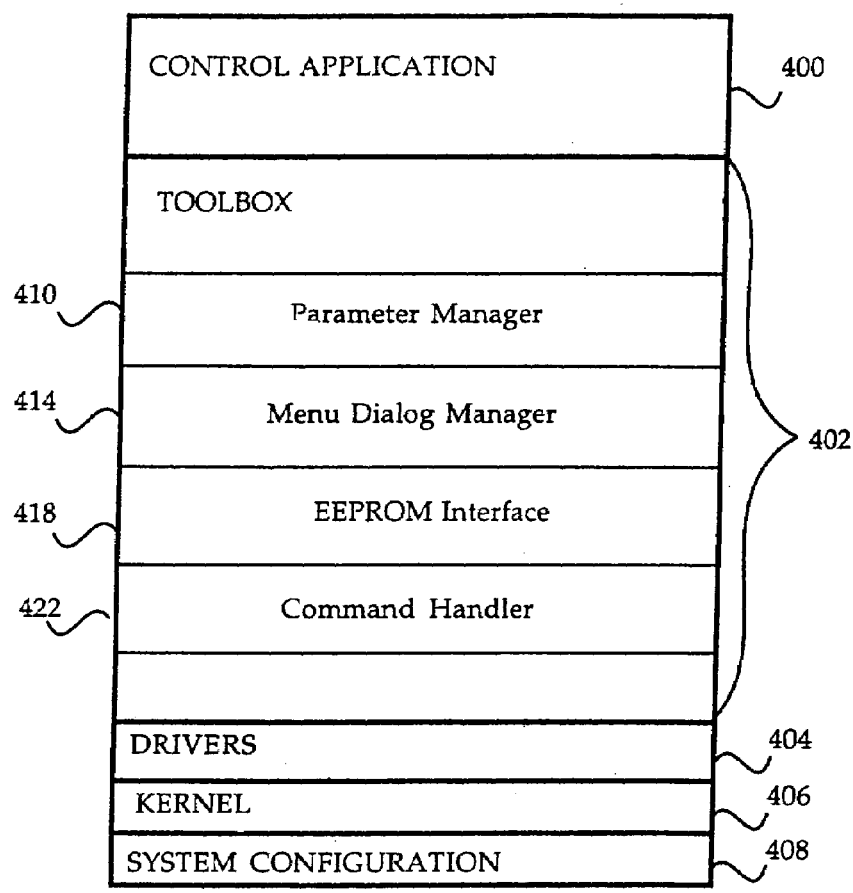
FIG. 6 is a diagram showing one embodiment showing the software components stored in non-volatile memory.

Referring now to FIG. 6, one embodiment showing the software components stored in non-volatile memory 88 is shown. In the FIG. 6 embodiment, non-volatile memory 88 includes control application 400, toolbox 402, drivers 404, kernel 406 and system configuration 408. Control application 400 includes program instructions for controlling and coordinating the various functions of camera 22. Toolbox 402 contains selected function modules including parameter manager 410, menu dialog manager 414, EEPROM interface 418 and command handler 422.

Parameter manager 410 includes software routines which control and coordinate various operating parameters in camera 22, according to the present invention. Menu dialog manager 414 includes software routines which coordinate functions related to the user interface, including displaying information on LCD screen 83 and handling information input from buttons. EEPROM interface 418 coordinates communications to and from an EEPROM via system bus 80. Command handler 422 accesses and handles various system commands and advantageously provides the commands to the appropriate destination within camera 22.

Drivers 404 control various hardware devices within camera 22 (for example, motors. Kernel 406 provides basic underlying services for the camera 22 operating system. System configuration 408 performs initial start-up routines for camera 22, including the boot routine and initial system diagnostics.

Figure 7:
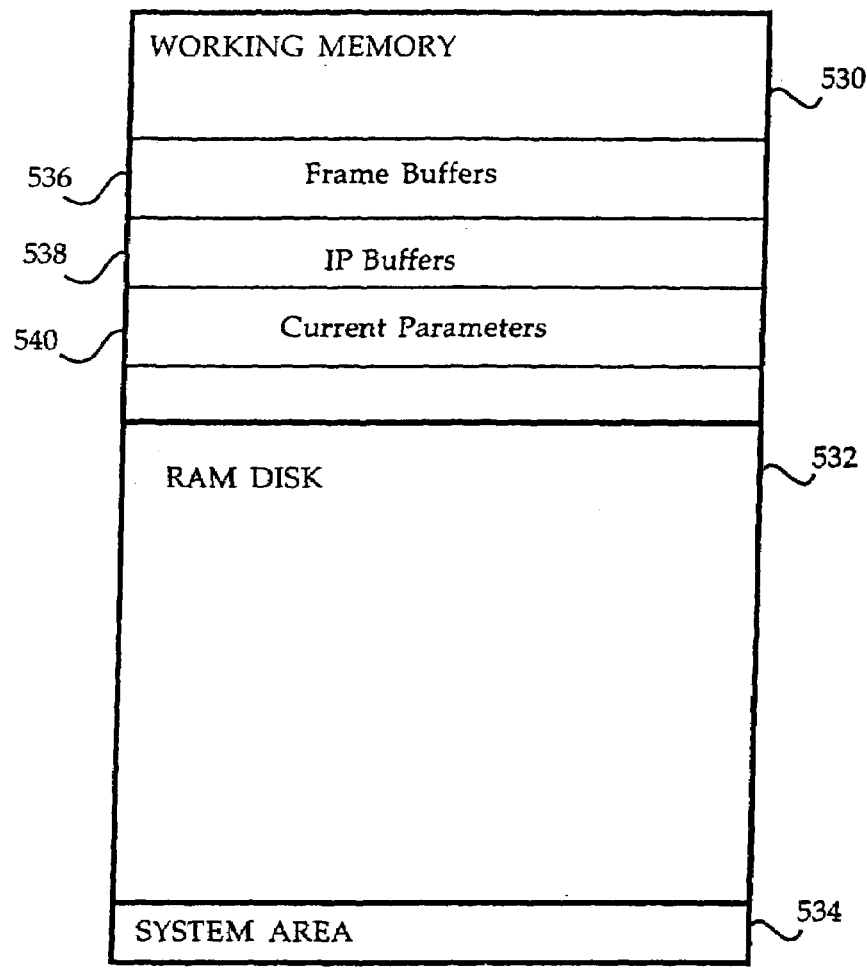
FIG. 7 is a diagram illustrating a memory map of one embodiment of dynamic random-access-memory (DRAM).

Referring now to FIG. 7, a memory map showing one embodiment of dynamic random-access-memory (DRAM) 86 is shown. In the FIG. 7 embodiment, DRAM 86 includes RAM disk 532, a system area 534, and working memory 530.

RAM disk 532 is a memory area used for storing raw and compressed image data and typically is organized in a sectored format similar to that of conventional hard disk drives. In the preferred embodiment, RAM disk 532 uses a well-known and standardized file system to permit server 12, via transceiver 24, to readily recognize and access the data stored on RAM disk 532. System area 534 typically stores data regarding system errors (for example, why a system shutdown occurred) for use by CPU 84 upon a restart of digital camera 22.

Working memory 530 includes various stacks, data structures and variables used by CPU 84 while executing the software routines used within digital camera 22. Working memory 530 also includes input buffers 538 for initially storing sets of raw image data received from imaging device 82 for image conversion, and frame buffers 536 for storing data for display on the LCD screen 83.

Working memory 530 further contains current parameters 540 which preferably include current settings for a wide variety of operational and functional attributes of camera 22.

Figure 8:
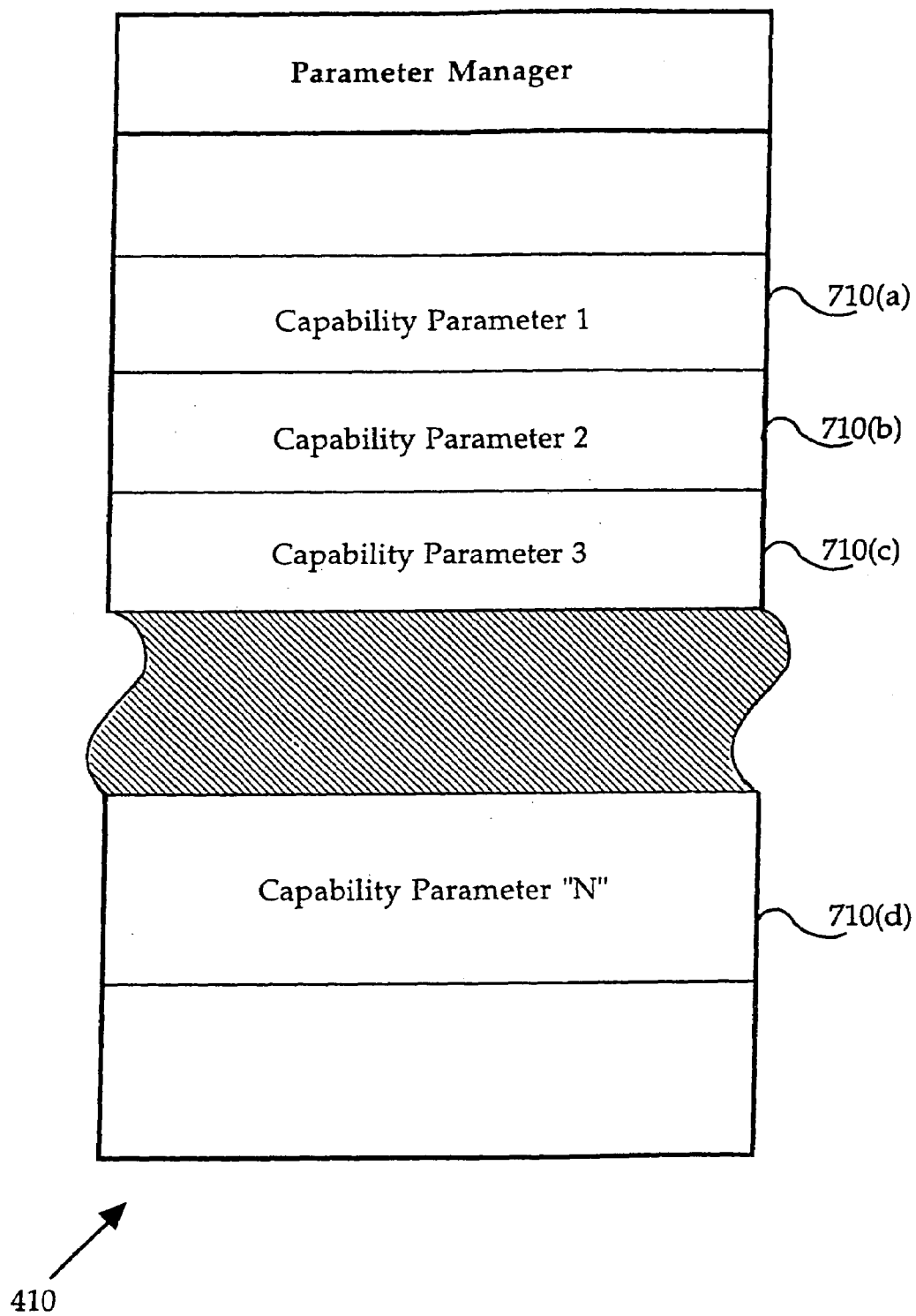
FIG. 8 is a diagram illustrating one embodiment for the capability parameters contained within the parameter manager, which are stored in part of the non-volatile memory.

Referring now to FIG. 8, a diagram is shown illustrating one embodiment for the capability parameters contained within the parameter manager 410, which are stored in part of the non-volatile memory. In addition to comprising executable software, parameter manager 410 includes capability parameter 1 (710 (a)) through capability parameter "N" (710(d)) which each preferably includes, but is not limited to, the capability for various operational and functional attributes of camera 22. In the preferred embodiment, there are three basic formats for capability parameters. The formats are called "list of values" format, "range of values" format, and "fixed value" format. The first two of these formats are discussed in detail below in conjunction with FIGS. 9A and 9B. The third format, the fixed value format, simply returns a fixed value for a camera's parameter. For example, a capability parameter for camera 22 name returns a user-defined string.

Specific preferred examples for capability parameter 1 (710(a)) through capability parameter "N" (710(d)) are provided below in TABLE II. However, various other capability parameters not listed in TABLE II are equally possible in other embodiments.

TABLE II

| PNAME | PARAMETER DESCRIPTION | VALUE TYPE | VALUE RANGE |
| --- | --- | --- | --- |
| xmod | Exposure mode specification | UInteger List | 1 = Auto<br>2 = Shutter priority<br>3 = Aperture priority<br>4 = Gain priority<br>5 = Manual |
| fmod | Focus mode specification | UInteger List | 1 = Auto<br>2 = Program<br>3 = Manual |
| smod | Strobe mode | UInteger | 0 = Off |

TABLE II-continued

| PNAME | PARAMETER DESCRIPTION | VALUE TYPE | VALUE RANGE |
| --- | --- | --- | --- |
|  | specification | List | 1 = Auto<br>2 = Fill<br>3 = Slave<br>4 = Sync |
| zpos | Zoom position specification | UInteger List | 100 = 1X (no zoom)<br>200 = 2X<br>300 = 3X |
| shut | Shutter speed specification; | UInteger | 125 through 4000000 measured in steps, with 16666 being equivalent to 1/60 second |
| fdst | Focus distance specification; measured in centimeters, with 65535 being infinity | UInteger | 30 through 65535 |

Figure 9A:
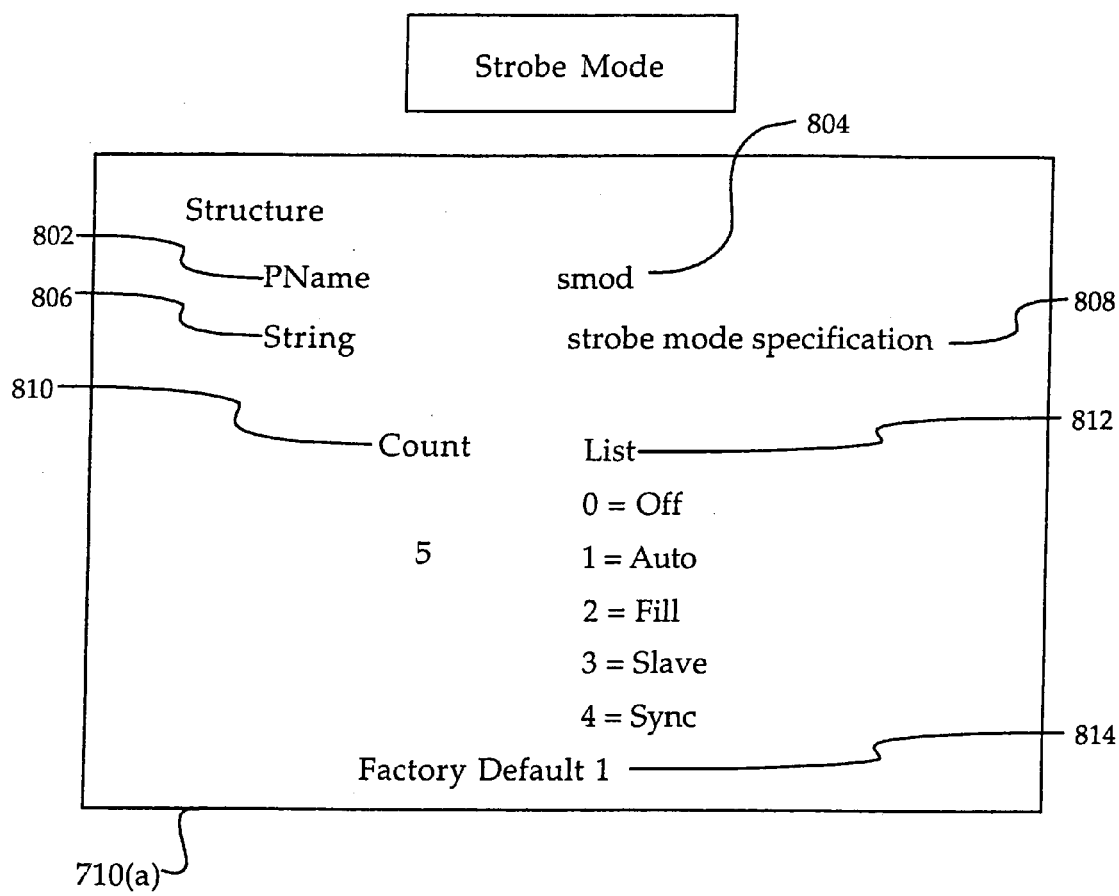
FIGS. 9A and 9B are diagrams illustrating two basic formats for capability parameters.

Referring now to FIG. 9A, a detailed view of the structure of an exemplary capability parameter 710(a) in "list of values" format is shown. In FIG. 9A, the capability parameter for "strobe mode specification" has been chosen to illustrate a capability parameter in "list of values" format. In the preferred embodiment, each "list of values" capability parameter typically contains a PName 802 comprising 32 bits containing 4 ASCII characters, which in this exemplary case is the character set "smod" 804. Additionally each "list of values" capability parameter typically contains a text string 806 containing a description of the capability parameter 808, which in the FIG. 9A example is "strobe mode specification". The description of the capability parameter 808 will, in each case, be a text string readable by a human user of the digital camera 22.

In the specific case of a capability parameter in "list of values" format, the value set for the capability parameter contains a variable (of type unsigned integer) called count 810 and a value list 812 which includes a list of integers and corresponding string variables. In the FIG. 9A example, "0" is associated with "Off", "1" is associated with "Auto", "2" is associated with "Fill", "3" is associated with "Slave", and "4" is associated with "Sync". In the preferred embodiment, count 810 contains a value which is the total number of integers present in value list 812. In the FIG. 9A example, count 810 contains the value "5".

The "list of values" format also typically includes a factory default setting 814. The factory default setting 814 contains a value corresponding to a value in list 812 which describes the appropriate factory default value. In the FIG. 9A example, factory default 814 is associated with count value "1", which corresponds to the element "Auto".

Figure 9B:
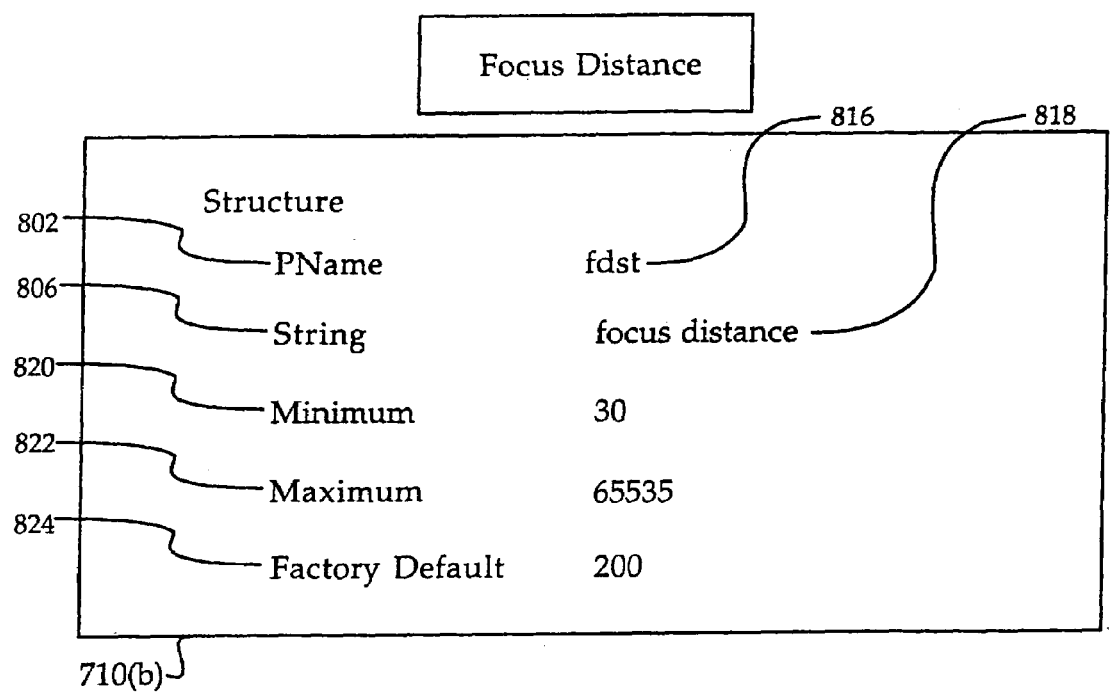

Referring now to FIG. 9B, a detailed view of the structure of an exemplary capability parameter 710(b) in "range of values" format is shown. In FIG. 9B, the capability parameter for "focus distance specification" has been chosen to illustrate a capability parameter in "range of values" format. In the preferred embodiment, each "range of values" capability parameter typically contains a PName 802 comprising 32 bits containing 4 ASCII characters, which in this second exemplary case is the character set "fdst" 816. Again each "range of values" capability parameter typically contains a text string 806 containing a description 818 of the particular capability parameter. In the FIG. 9B example, description 818 is "focus distance", meaning that the numerical values are focal distances in centimeters.

In the specific case of a capability parameter in "range of values" format, the value set of the capability parameter contains three variables (of type unsigned or signed integer) which are called minimum 820, maximum 822, and factory default 824. In the FIG. 9B example of the focus distance capability parameter, the minimum 820 contains the value 30, the maximum 822 contains the value 65535, and the factory default 824 contains the value 200.

It is important to note in the examples given above in FIGS. 9A and 9B that all of the human language readable content is modularized in the text string 806 and when necessary in the list 812. The only part of the value set for the capability parameters examined in FIGS. 9A and 9B which would need changing for the purpose of human language localization would be these text strings 806 and lists 812. For example, if a batch of digital cameras 22 was ordered for use in France, the modularity of the human language content would allow the digital camera's manufacturer to more easily change the capability parameter value sets so that the human language readable content would be in the French language. Alternatively, in a multiple language camera 22, multiple sets of strings can be utilized, where the current set is selected by the current language settings in the camera 22.

Figure 10:
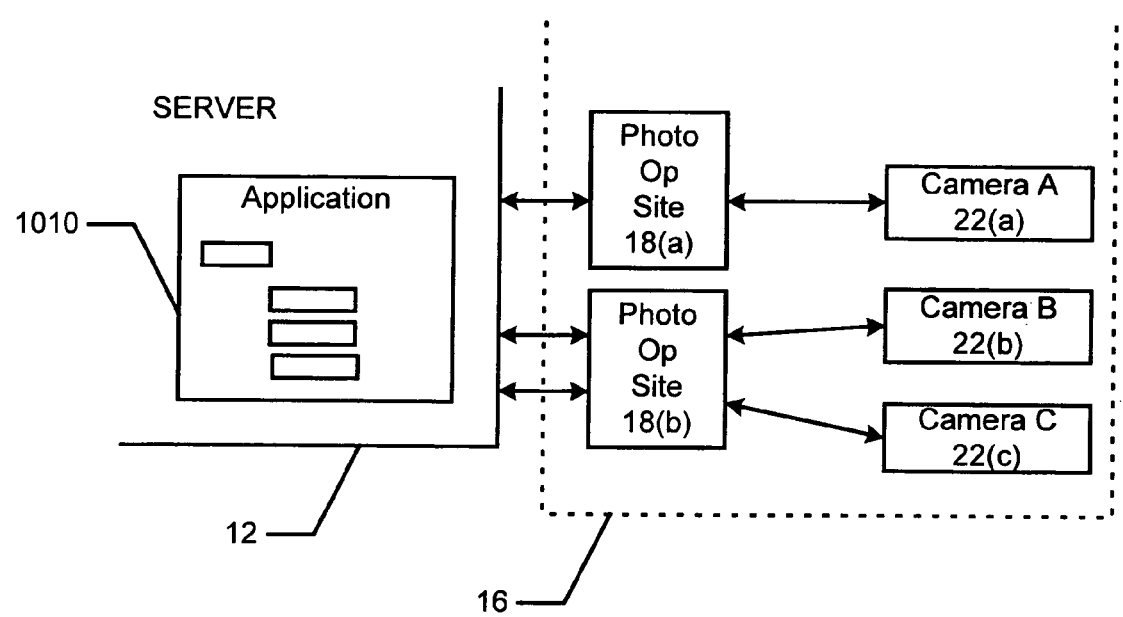
FIG. 10 depicts one implementation of the present invention where the server runs an application for managing a number of photo op transceivers at a large primary site.

Referring now to FIG. 10, one implementation of the present invention is shown. Assume that the server 12 is running an application for managing a number of photo op transceivers at photo op sites 18(*a*) and 18(*b*) at a large primary site 16. Therefore, the server 12 may be connected to several digital cameras 22, e.g., camera 22 A (a) 22(*a*), camera 22 B 22(*b*), and camera 22 C 22(*c*). With the present invention, the application 1010 may then issue the GetCameraCapabilities command to each of the cameras 22(*a*), 22(*b*), and 22(*c*).

It is important to note that the three cameras 22(*a, b* and *c*) in FIG. 10 may each support different ranges or a different list of values for each capability parameter. For example, camera 22*a* may support only 1× and 2× zoom, whereas camera 22*b* may support 1X, 2x, and 3× zoom. The capability parameter value sets returned from cameras 22*a* and 110*b* will reflect the differences in these and other capabilities of the digital cameras 22. Application 1010 may then receive the capability parameters from the three cameras 22(*a, b* and *c*) and responsively send the appropriate camera setting parameters to the respective cameras 22. Thus, the present invention enables the server 12 to be compatible with many types of cameras 22, rather than requiring the primary site 16 to restrict this service to only a select type of camera 22.

Figure 11:
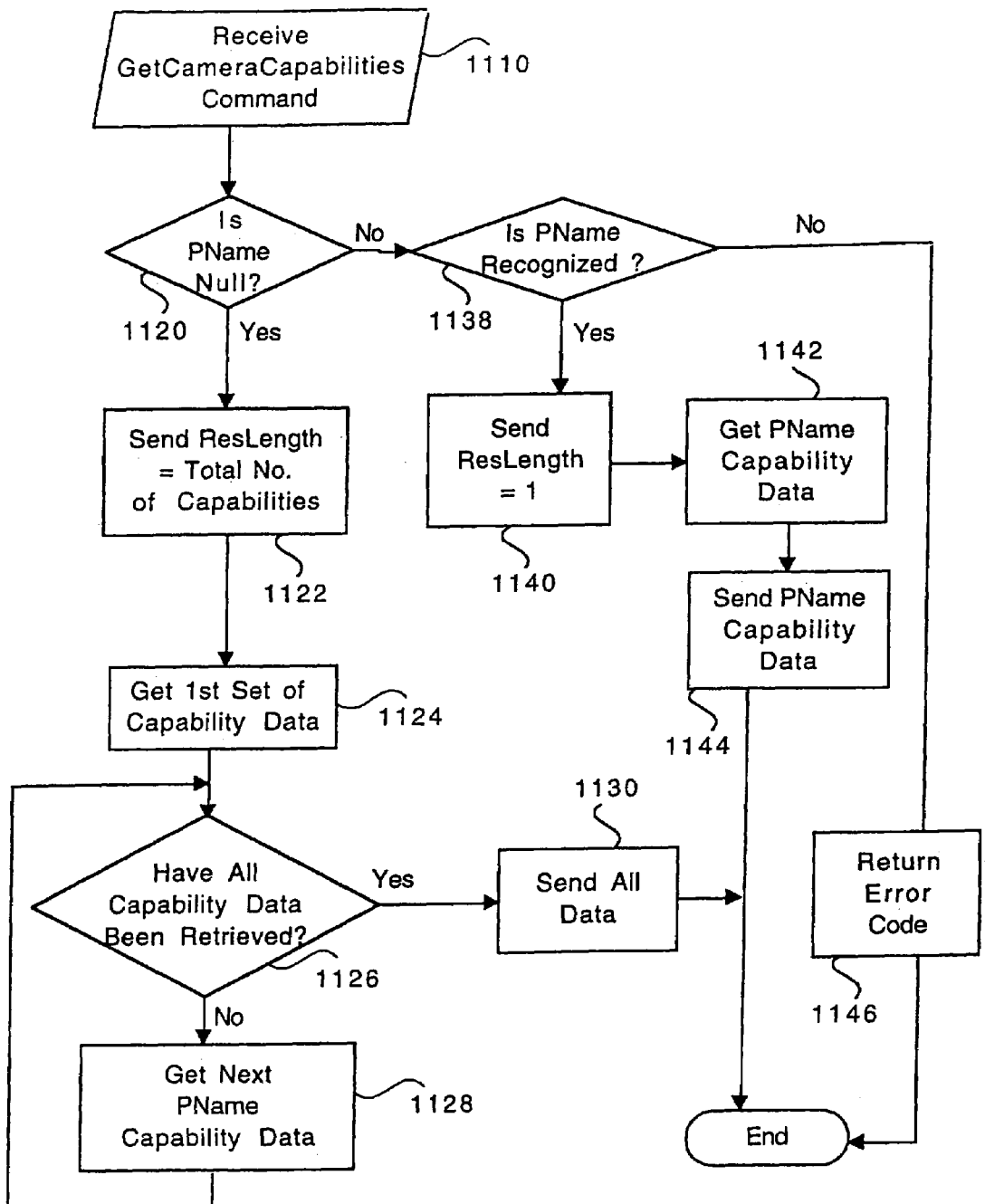
FIG. 11 is a diagram showing the processing of the GetCameraCapabilities command within digital camera in accordance with a first embodiment of the invention.

Referring now to FIG. 11, the processing of the GetCameraCapabilities command within digital camera 22 in accordance with a first embodiment of the invention is shown. In initial step 1110, the parameter manager 410 receives the GetCameraCapabilities command. Then, in step 1120, if the GetCameraCapabilities command has its PName field set to four null characters, the implication is that the server 12 is requesting a complete set of the capability parameter data from the digital camera 22. In this case, the unsigned integer ResLength (representing the number of items sent as capability parameters) is sent, in step 1122, as the total number of capability parameters present in digital camera 22. Parameter manager 410 then proceeds, in step 1124, to get the first set of capability parameter data, and, in step 1126, determines if all of the sets of capability parameter data have been retrieved. If not all of the sets have been retrieved, the parameter manager 410, in step 1128, proceeds to get the next set of capability parameter data and then loops back for another decision in step 1126. In this manner the parameter manager 410 retrieves all the sets of capability parameter data. Once the complete set of capability parameter data is retrieved, camera 22 sends the data to the server 12, in step 1130, and the FIG. 11 process ends.

If, in step 1120, the PName field in the GetCameraCapabilities command was not a set of four null characters, then the parameter manager 410, in step 1138, decides if the value of the PName is for a recognized parameter. If the value of the PName is for a recognized parameter, then the parameter manager 410, in step 1140, sends the ResLength as the number 1, retrieves the capability parameter data corresponding to the value of the PName in step 1142, and sends this data, in step 1144, to the server 12. If the value of the PName is not for a recognized parameter, then the parameter manager 410, in step 1146, returns an error code.

Figure 12:
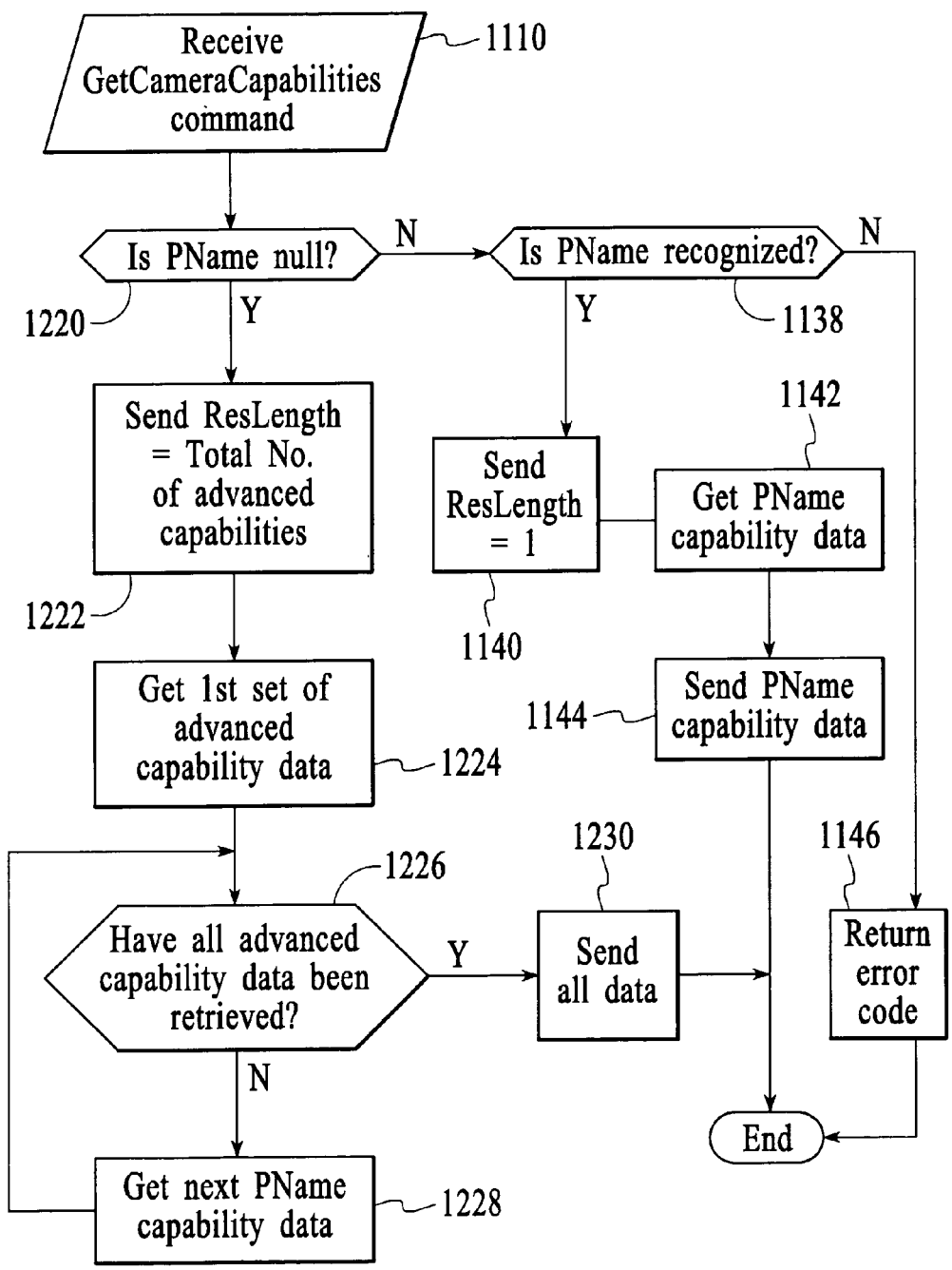
FIG. 12 is a diagram showing the processing of the GetCameraCapabilities command within digital camera in accordance with a second embodiment of the present invention.

Referring now to FIG. 12, the processing of the GetCameraCapabilities command within digital camera 22 in accordance with a second embodiment of the present invention is shown. This second embodiment presupposes that the digital camera 22 industry reaches a concurrence about what constitutes a basic core set of standard capability parameters, which will then be common to all digital cameras 22. The processing in this flowchart is analogous to that shown in FIG. 11, with the exception of what happens following step 1220 if the PName field is set to four null characters. In this case, the ResLength is set, in step 1222, to the total number of capability parameters which are not part of the basic core set, i.e., the total number of advanced capability parameters. Then, during steps 1224, 1226, 1228, and 1230, which get and send the capability parameter data, only the capability parameter data for the advanced capability parameters are retrieved and sent to server 12. This retrieving of only those capability parameter data which are not part of the basic core set advantageously saves interface time and system resources such as memory.

In the FIGS. 11 and 12 embodiments, the server 12 issues the GetCameraCapabilities command. As mentioned during the discussion of FIG. 9, in other embodiments of the present invention, the GetCameraCapabilities command may be issued by a system user activating the buttons and dials of the digital camera 22, or by a special parameter script imported into the digital camera 22 on the removable memory 88 and executed by the CPU 84.

A method and system for automatically configuring a hand-held camera 22 to improve the quality of an image taken with the camera 22 of a particular subject at a photo opportunity site has been disclosed. The present invention has been described in accordance with the embodiments shown, and one of ordinary skill in the art will readily recognize that there could be variations to the embodiments, and any variations are would be within the spirit and scope of the present invention. In addition, software written according to the present invention may be stored on a computer-readable medium, such as a removable memory, or transmitted over a network, and loaded into any of the devices described herein for execution. Accordingly, many modifications may be made by one of ordinary skill in the art without departing from the spirit and scope of the appended claims.

What is claimed is:

1. A method for automatically configuring a hand-held camera to improve quality of an image taken with the camera of a particular subject at a photo opportunity site, comprising:
   (a) establishing wireless communication between the photo opportunity site and the camera;

(b) determining conditions at the photo opportunity site;

(c) determining values for a set of camera setting parameters that are optimized for the conditions at the photo opportunity site to enhance image quality of a picture taken at that location;

(d) retrieving the set of camera setting parameter values from a database; and (e) pushing the set of camera setting parameter values via the wireless communication to the camera to automatically configure the camera to take a picture of the subject.

2. The method of claim 1 further including the steps of storing the setting parameter values in a database, and updating the setting parameter values pushed to the camera as conditions change at the photo opportunity site.

3. The method of claim 1 further including the step of querying the camera for capabilities to determine the setting parameter values to send to the camera.

4. The method of claim 1 further including the step of pushing additional content to the camera regarding the subject.

5. The method of claim 4 further including the step of including a category tag as the additional content for automatic categorization of the picture.

6. The method of claim 4 further including the step of providing at least one of an image file, an audio file, and a text file as the additional content.

7. The method of claim 6 further including the step of playing the additional content on the camera, thereby allowing the camera to become a tour aid device as well as a camera.

8. The method of claim 6 further including the step of providing a timestamp with the additional content such that the additional content is deleted from the camera after a predetermined amount of time.

9. The method of claim 8 further including the step of providing the user with an opportunity to purchase the additional content.

10. The method of claim 1 further including the steps of determining the camera setting parameter values that are pushed to the camera based in part on weather conditions at the photo opportunity site.

11. A system for automatically configuring a hand-held camera to improve quality of an image taken with the camera of a particular subject at a photo opportunity site, comprising:

(a) wireless communication means for establishing communication with the camera;

(b) conditions determining means for determining conditions at the photo opportunity site;

(c) storage means for storing a set of camera setting parameter values that are optimized for the conditions at the photo opportunity site to enhance image quality of a picture taken at that location; and (d) retrieving means for retrieving the set of camera setting parameter values from a database, wherein the wireless communication means pushes the set of camera setting parameter values to the camera for automatic configuration of the camera to take a picture of the subject.

12. The system of claim 11 wherein the setting parameter values are updated as conditions change at the photo opportunity site.

13. The system of claim 11 wherein the storage means comprises a database.

14. The system of claim 11 further including a computer coupled between the storage means and the wireless communications means.

15. The system of claim 11 wherein the setting parameter values sent to the camera are based on the capabilities of the camera.

16. The system of claim 14 wherein the server queries the camera for the capabilities of the camera and queries the database based on the capabilities.

17. The system of claim 11 wherein additional content is pushed to the camera regarding the subject, and the additional content is displayed on a display of the camera, thereby allowing the camera to become a tour aid device as well as a camera.

18. The system of claim 17 wherein the additional content comprises at least one of an image file, an audio file, and a text file.

19. The system of claim 18 wherein a timestamp is associated with the additional content, such that the additional content is deleted from the camera after a predetermined amount of time.

20. The system of claim 19 wherein the user is provided with an opportunity to purchase the additional content.

21. The system of claim 20 wherein the database includes camera setting parameter values and additional content for a plurality of photo opportunity sites, each having a respective transceiver in communication with the server, wherein the server functions to send the respective camera setting parameter values and the additional content to each photo opportunity site.

22. A computer-readable medium containing program instructions for automatically configuring a hand-held camera to improve quality of an image taken with the camera of a particular subject at a photo opportunity site, the instructions for:

(a) establishing wireless communication between the photo opportunity site and the camera;

(b) determining conditions at the photo opportunity site;

(c) determining values for a set of camera setting parameters that are optimized for the conditions at the photo opportunity site to enhance image quality of a picture taken at that location;

(d) retrieving the set of camera setting parameter values from a database; and (e) pushing the set of camera setting parameter values via the wireless communication to the camera to automatically configure the camera to take a picture of the subject.

23. The computer-readable medium of claim 22 further including the instructions of storing the setting parameter values in a database, and updating the setting parameter values as conditions change at the photo opportunity site.

24. The computer-readable medium of claim 22 further including the instruction of querying the camera for capabilities to determine the setting parameter values to send to the camera.

25. The computer-readable medium of claim 22 further including the instruction of pushing additional content to the camera regarding the subject and playing the additional content on the camera, thereby allowing the camera to become a tour aid device as well as a camera.

26. The computer-readable medium of claim 25 further including the instruction of providing at least one of an image file, an audio file, and a text file as the additional content.

27. The computer-readable medium of claim 26 further including the instruction of providing a timestamp with the additional content such that the additional content is deleted from the camera after a predetermined amount of time.

28. The computer-readable medium of claim 27 further including the instruction of providing the user with an opportunity to purchase the additional content.

29. The computer-readable medium of claim 22 further including the instructions of: providing a plurality of photo opportunity sites, and storing setting parameter values in a database for each of the photo opportunity sites.

30. A method implemented in a hand-held camera for automatically configuring the camera to improve quality of an image of a particular subject at a photo opportunity site, comprising:
  (a) in response to wireless communication being established with the photo opportunity site,
  (b) receiving camera setting parameter values from the photo opportunity site, wherein the parameter values are based on conditions at the photo opportunity site and optimized for the photo opportunity site;
  (c) using the parameter values to automatically configure corresponding camera settings;
  (d) locking at least a portion of the camera settings; and
  (e) capturing the image using the capture settings.

31. The method of claim 30 further including the steps of receiving additional content regarding the photo opportunity site, and playing the additional content on the camera, such that a user's camera becomes a tour aid device as well as a camera.

32. The method of claim 31 further including the step of providing at least one of an image file, an audio file, and a text file as the additional content.

33. The method of claim 31 further including the step of providing a timestamp with the additional content such that the additional content is deleted from the camera after a predetermined amount of time.

34. The method of claim 31 further including the step of providing the user with an opportunity to purchase the additional content.

35. The method of claim 30 further including the step of providing a digital camera as the camera.

36. The method of claim 30 further including the step of in response to receiving a software command from the photo opportunity site, retrieving and returning current capabilities of the digital camera.

37. A computer-readable medium in a hand-held camera containing program instructions for automatically configuring the camera to improve quality of an image of a particular subject at a photo opportunity site, comprising the instructions of:
  (a) in response to wireless communication being established with the photo opportunity site,
  (b) receiving camera setting parameter values from the photo opportunity site, wherein the parameter values are based on conditions at the photo opportunity site and optimized for the photo opportunity site;
  (c) using the parameter values to automatically configure corresponding camera settings;
  (d) locking at least a portions of the camera settings; and
  (e) capturing the image using the capture settings.

38. The computer-readable medium of claim 37 further including the instructions of receiving additional content regarding the photo opportunity site, and playing the additional content on the camera, such that a user's camera becomes a tour aid device as well as a camera.

39. The computer-readable medium of claim 38 further including the instruction of providing at least one of an image file, an audio file, and a text file as the additional content.

40. The computer-readable medium of claim 38 further including the instruction of providing a timestamp with the additional content such that the additional content is deleted from the camera after a predetermined amount of time.

41. The computer-readable medium of claim 38 further including the instruction of providing the user with an opportunity to purchase the additional content.

42. The computer-readable medium of claim 37 further including the instruction of providing a digital camera as the camera.

43. The computer-readable medium of claim 37 further including the instruction of in response to receiving a software command from the photo opportunity site, retrieving and returning current capabilities of the digital camera.

44. A system for automatically configuring a hand-held camera having wireless communication capability, comprising:
  (a) a database for storing camera setting parameter values that are based on conditions at a photo opportunity site and optimized for a photo opportunity site to enhance image quality of a picture taken at the photo opportunity site; and
  (b) a transceiver in communication with the database that is located in proximity to where a user would take a picture at the photo opportunity site with the camera, such that when the digital camera comes within range of the transceiver, wireless communication with the camera is established, the transceiver for transmitting the digital camera setting parameter values to the digital camera to automatically configure the camera's capture settings, such that when the picture is taken, image quality is thereby improved.

45. The system of claim 44 further including a server in communication with the database and the transceiver for sending the camera setting parameter values to the transceiver.

46. The method of claim 44 wherein the database includes additional content regarding the photo opportunity site, and the transceiver pushes the additional content to the digital camera for display.

47. The system of claim 46 wherein the additional content includes a category tag for automatic categorization of the picture.

48. The system of claim 46 wherein the additional content comprises at least one of an image file, an audio file, and a text file.

49. The system of claim 48 wherein the additional content is played on the camera, thereby allowing the camera to become a tour aid device as well as a camera.

50. The system of claim 46 wherein a timestamp is associated with the additional content, such that the additional content is deleted from the camera after a predetermined amount of time.

51. The system of claim 46 wherein the user is provided with an opportunity to purchase the additional content.

52. The system of claim 44 wherein what camera setting parameter values are pushed to the camera is determined based in part on weather conditions at the photo opportunity site.

* * * * *